United States Patent
Palit

(10) Patent No.: US 11,325,154 B2
(45) Date of Patent: May 10, 2022

(54) RESONANT FREQUENCY TRACKING AND CONTROL

(71) Applicant: TEXAS INSTRUMENTS INCORPORATED, Dallas, TX (US)

(72) Inventor: Supriyo Palit, Kolkata (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 102 days.

(21) Appl. No.: 16/669,202

(22) Filed: Oct. 30, 2019

(65) Prior Publication Data

US 2020/0139403 A1 May 7, 2020

Related U.S. Application Data

(60) Provisional application No. 62/754,735, filed on Nov. 2, 2018.

(51) Int. Cl.
| | |
|---|---|
| B06B 1/02 | (2006.01) |
| G06F 3/01 | (2006.01) |
| G05D 19/02 | (2006.01) |
| B06B 1/04 | (2006.01) |

(52) U.S. Cl.
CPC ........... *B06B 1/0253* (2013.01); *B06B 1/045* (2013.01); *G05D 19/02* (2013.01); *G06F 3/016* (2013.01); *B06B 2201/70* (2013.01)

(58) Field of Classification Search
USPC ........................................................ 318/119
See application file for complete search history.

(56) References Cited

U.S. PATENT DOCUMENTS

| | | | |
|---|---|---|---|
| 6,437,524 B1 * | 8/2002 | Dimanstein | ........... H02P 25/032 318/119 |
| 2019/0294247 A1 * | 9/2019 | Hu | ........................ B06B 1/0207 |

* cited by examiner

*Primary Examiner* — Jorge L Carrasquillo
(74) *Attorney, Agent, or Firm* — John R. Pessetto; Charles A. Brill; Frank D. Cimino

(57) ABSTRACT

For a resonator system such as a (haptic) LRA, a methodology for resonant frequency (F0) tracking/control with continuous resonator drive, based on estimating back-emf, including estimating resonator resistance based at least in part on the sensed resonator drive signals, with back-emf estimated based at least in part on the sensed resonator drive signals and the estimated resonator resistance. A phase difference is detected between the resonator drive signals, and the estimated back-emf signals, generating control for resonator drive frequency, which can be used to iteratively adjust the resonator drive frequency until phase coherent with the estimated back-emf signals (F0 lock), such as for driving the resonator at or near a resonant frequency. An amplitude control loop can be used to iteratively adjust resonator drive amplitude based on a difference between estimated back-emf and a target back-emf derived from a rated back-emf and the resonator frequency resonant frequency.

6 Claims, 16 Drawing Sheets

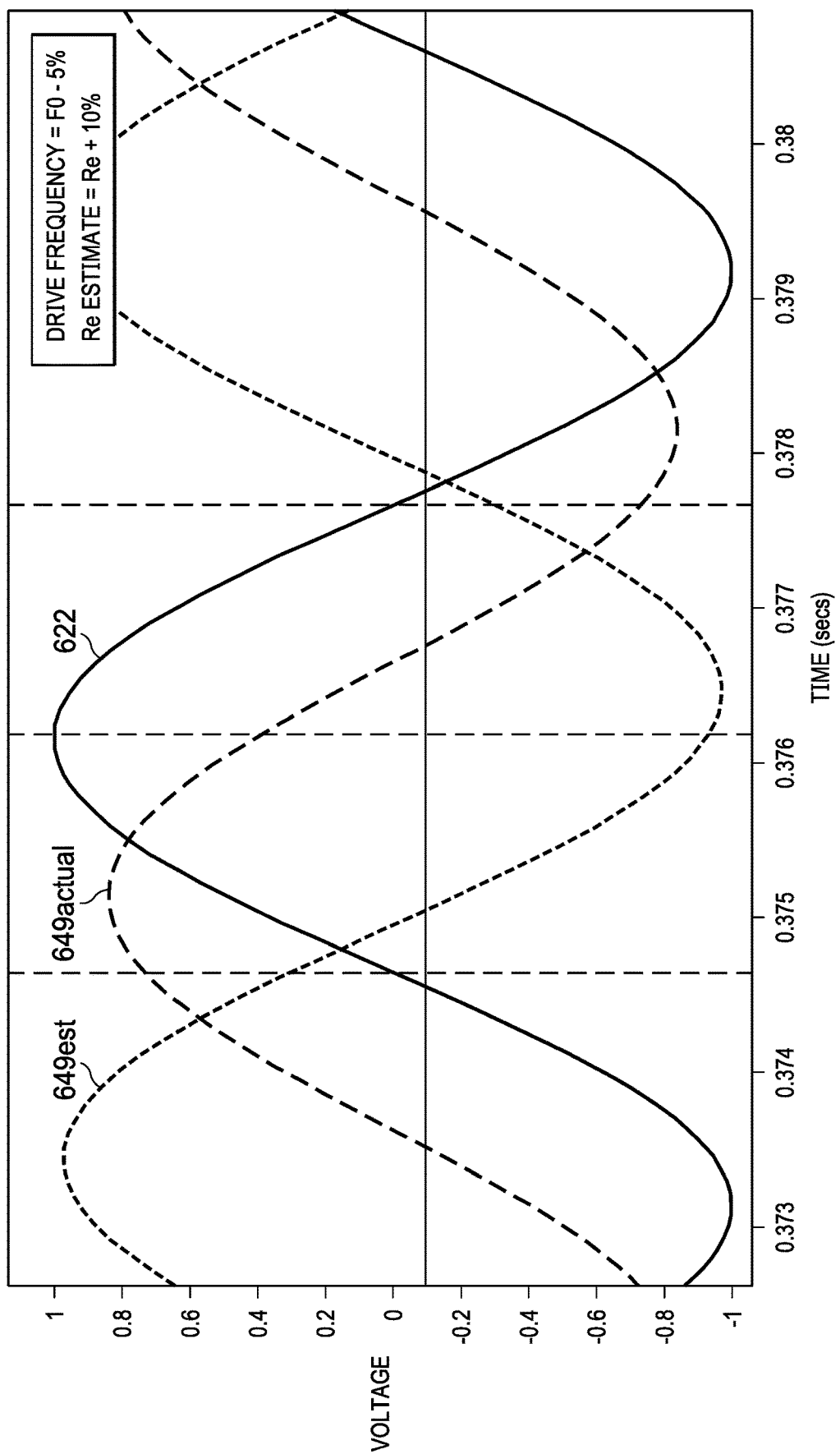

RESONANT FREQUENCY TRACKING AND CONTROL

CROSS-REFERENCE TO RELATED APPLICATIONS

Priority is claimed under 37 CFR 1.78 and 35 USC 119(e) to U.S. Provisional Application 62/754,735, filed 2018 Nov. 2, which is incorporated by reference in its entirety.

BACKGROUND

Linear resonant actuators (LRAs) use a resonator to provide haptic feedback. LRA resonators are driven at (or near) a resonant frequency (F0) to optimize efficiency and maximize vibration amplitude/strength (performance). Operating a high-Q LRA resonator outside a narrow F0 range can result in a significant drop in vibration amplitude/strength. Resonant frequency can vary due to, for example, lot-to-lot differences, temperature, aging, and mounting fixture.

One approach to tracking/controlling resonant frequency is to toggle between drive and sense modes in each drive/vibration cycle. In sense mode, back-emf is sensed (measured), and used to iteratively adjust drive frequency. Switching between drive and sense modes can result in reduced efficiency and acceleration, and can introduce mechanical noise.

While this Background information references linear resonant actuators, such as for haptic devices, this Disclosure is more generally directed to resonant frequency tracking/control for resonator devices.

BRIEF SUMMARY

This Brief Summary is provided as a general introduction to the Disclosure provided by the Detailed Description and Drawings, summarizing aspects and features of the Disclosure. It is not a complete overview of the Disclosure, and should not be interpreted as identifying key elements or features of, or otherwise characterizing or delimiting the scope of, the disclosed invention.

The Disclosure describes apparatus and methods for Resonant frequency (F0) tracking/control with continuous resonator drive, based on estimating back-emf (including estimating resonator resistance) from sensed resonator drive (I or V), iteratively adjusting resonator drive frequency until it is phase coherent with estimated back-emf (F0 lock). An example application is a linear resonant actuator for providing haptic feedback.

According to aspects of the Disclosure, the Disclosed method of controlling a resonator for operation at a resonant frequency can be used in a system that includes a resonator, and a resonator driver to provide resonator drive signals at a resonator drive frequency. A methodology for resonant frequency tracking/control includes sensing resonator drive to provide sensed resonator drive signals, and generating frequency control signals for input to a resonator driver to track and control resonator drive frequency. Resonant frequency tracking/control includes estimating back-emf, including estimating resonator resistance based at least in part on the sensed resonator drive signals, and estimating back-emf to generate corresponding estimated back-emf signals, based at least in part on the sensed resonator drive signals and the estimated resonator resistance. A phase difference is detected between the resonator drive signals, and the estimated back-emf signals, and used to generate the frequency control signals, for example, to iteratively adjust the frequency of the resonator drive signals until phase coherent with the estimated back-emf signals, for driving the resonator at or near a resonant frequency.

According to aspects of the Disclosure, a circuit for driving a resonator with controlled resonator drive signals includes resonator drive circuitry, coupled to an output terminal, to provide controlled resonator drive signals at a resonator drive frequency, and sense circuitry to sense resonator drive, and generate sensed resonator drive signals. A frequency tracker/controller provides frequency control signals to the resonator drive circuitry to control the resonator drive signals, and includes back-emf estimation circuitry to estimate back-emf, including resonator resistance circuitry to estimate resonator resistance based at least in part on the sensed resonator drive signals, and back-emf estimation circuitry to estimate back-emf, and generate corresponding estimated back-emf signals, based at least in part on resonator resistance. Phase detection circuitry determines a phase difference between the resonator drive signals, and the estimated back-emf signals, and frequency control circuitry to generate frequency control signals for controlling the resonator drive signals to control resonator drive frequency.

According to other aspects of the Disclosure, a circuit to control driving a resonator can be used in a system that includes a resonator, and a resonator driver to provide resonator drive signals at a resonator drive frequency, and a sensor to sense resonator drive. The circuit includes a sensor input configured to receive input sensed resonator drive signals corresponding to sensed resonator drive, and a frequency control output, and includes a frequency tracker/controller coupled to the sensor input, and to the frequency control output. The frequency tracker/controller includes a back-emf estimator to estimate back-emf, including to estimate resonator resistance based at least in part on sensed resonator drive signals from the sensor input, and to estimate back-emf, and generate corresponding estimated back-emf signals, based at least in part on the sensed resonator drive signals and the estimated resonator resistance. A phase detector determines a phase difference between the resonator drive signals, and the estimated back-emf signals, and a frequency controller to generate frequency control signals for output to the frequency control output.

Other aspects and features of the invention claimed in this Patent Document will be apparent to those skilled in the art from the following Disclosure.

BRIEF DESCRIPTION OF THE DRAWINGS

FIGS. 2A/2B illustrates back-emf magnitude and phase (139) relative to resonator drive frequency, including back-emf frequency and phase at the resonant frequency 139 F0; and FIG. 2C illustrates, relative to resonator drive voltage 22, example leading and trailing back-emf waveforms 139L and 139T.

FIG. 3A illustrates an example alternate F0 tracking/control loop 101A, with resonator drive voltage feedback 22V/225, and resonator current sense 221; FIG. 3B illustrates an example alternate F0 tracking/control loop 101B, with resonator voltage sense 225/226, and resonator current sense 221; FIG. 3C illustrates an example alternate F0 tracking/control loop 101C, with resonator drive voltage feedback 22V/225, and resonator current sense 221, and including pilot tone insertion 23 for resonator resistance Re estimation 241; FIG. 3D illustrates an example alternate F0 tracking/control loop 101D, with resonator voltage sense 225/226, and resonator current sense 221, and including pilot tone insertion 23 for resonator resistance Re estimation 241.

FIG. 5A illustrates back-emf 539, including back-emf within the first cycle (first few cycles) at 539 bemf; and FIG. 5B illustrates total resonator impedance 530, including resonator resistance Re approximated by 549Re.

FIG. 6 provides example signal plots illustrating, for implementations of the adaptive resonant frequency tracking/control architecture of the Disclosure, phase error due to inaccurate resonator resistance Re estimation, which can be corrected by adaptive Re auto-correction (FIG. 1 and FIGS. 3A-3D, 143), including illustrating resonator drive voltage 622, together with estimated back-emf 649est, and actual back-emf 649actual (both normalized relative to the drive voltage), where 649actual is within a valid phase range, and 649est is outside the valid phase range due to error in Re estimation.

FIG. 7A provides example signal plots illustrating resonator drive voltage 722, and example phase difference waveforms based on estimated back-emf, leading 739L and trailing 739T, including indicating valid ranges of back-emf for positive/negative peak detection 739PK, and valid ranges for positive-to-negative and negative-to-positive zero crossing 739ZX, which can be used for resonator resistance Re auto-correction within the F0 tracking/control loop (FIGS. 3A-3D, 143), and which methodology is summarized in the Detailed Description in connection with Table 1; FIG. 7B illustrates an example use of zero crossings 739ZX of back-emf 739 to estimate phase difference for a drive frequency of approximately F0-10%, because the sensed resonator current exceeds the current thresholds only in the zero-crossing regions 739ZX; FIG. 7C illustrates an example use of both peak and zero crossing 739PK/739ZX of the back-emf 739 to estimate phase difference for a drive frequency approximately F0-5%, because the sensed resonator current exceeds the current thresholds for both peak and zero-crossing regions 739PK/739ZX; and FIG. 7D illustrates use of peak crossings 739PK of back-emf 739 to estimate phase difference for a drive frequency of approximately F0-1%, because the sensed resonator current exceeds the current thresholds only in the peak crossing regions 739PK.

FIGS. 8A-8B illustrate the magnitude and phase response of the resonator impedance induced due to back-emf resonator impedance (VBEMF/I), including response at the resonant frequency 830 F0; FIGS. 8C-8D illustrate the convergence of adaptive F0 tracking/control when the initial driver frequency is +/-10% above/below the resonant frequency F0.

DETAILED DESCRIPTION

Figure 1:
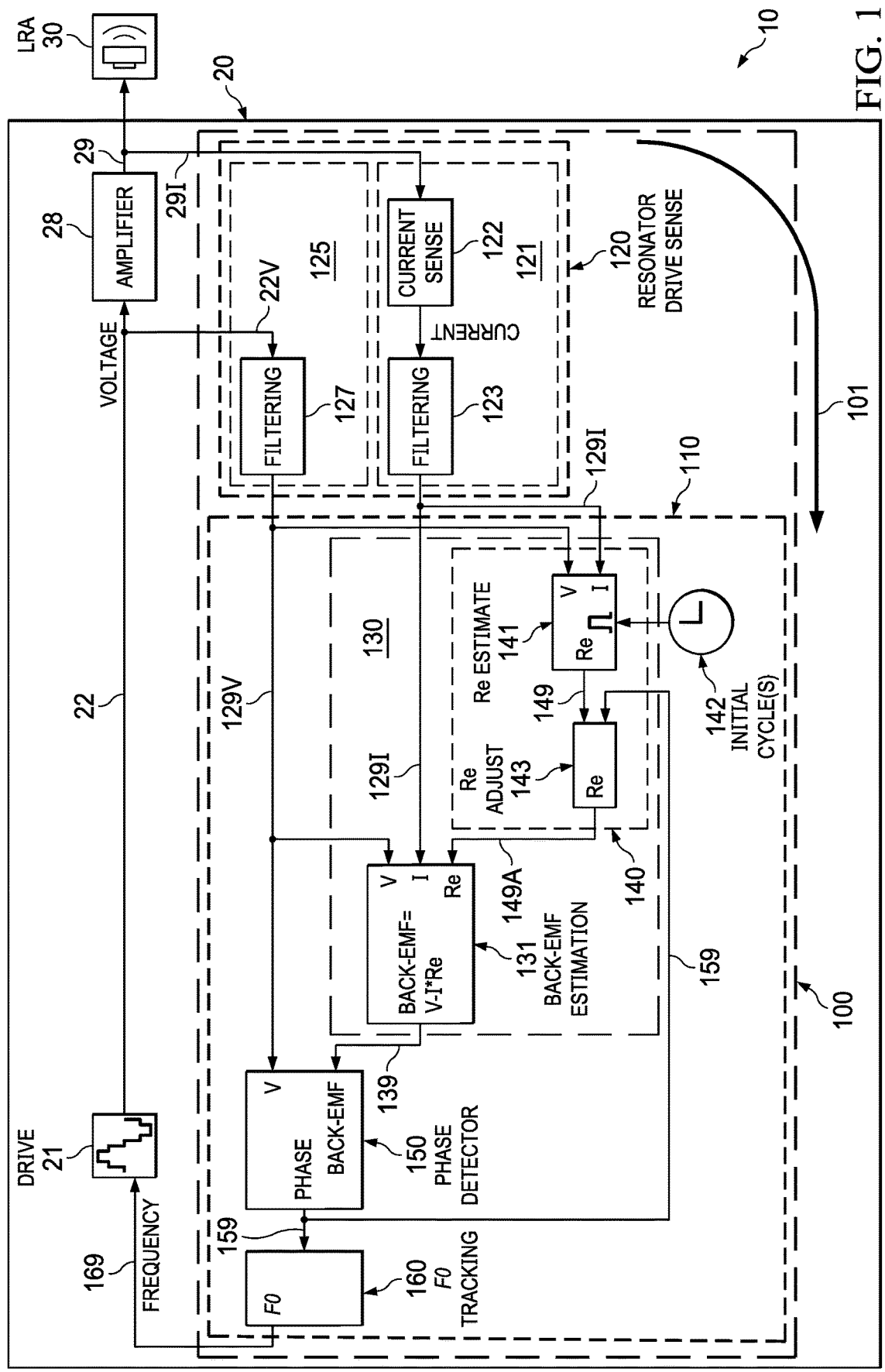
FIG. 1 illustrates an example linear resonant actuator system 10, including an example adaptive resonant frequency tracking/control architecture 20 to (continuously) drive a resonator 30 at a resonant frequency (F0), based on estimating back-emf (including estimating resonator resistance), according to the Disclosure, including an adaptive F0 tracking/control loop to adjust resonator drive frequency, based on estimating back-emf (130), including estimating resonator resistance Re (140), from sensed resonator current (120) and either resonator drive voltage (22V) or sensed resonator voltage, with estimated back-emf used to estimate a phase difference (150/159) between resonator drive frequency and estimated back-emf frequency, iteratively adjusting resonator drive frequency (160/169) until it is phase coherent with estimated back-emf (F0 lock).

This Description and the Drawings constitute a Disclosure, including design examples and implementations, and including illustrating various technical features and advantages for: Resonant frequency (F0) tracking/control with continuous resonator drive (V or I), based on estimating back-emf (including estimating resonator resistance) from sensed resonator drive (I or V), iteratively adjusting resonator drive frequency until it is phase coherent with estimated back-emf (F0 lock).

This Disclosure uses the following nomenclature. A resonator operates based on resonator drive signals at a resonator drive frequency (including operation at or near a resonant frequency F0 for the resonator). The resonator is driven continuously based on either resonator drive voltage (V) signals, or resonator drive current (I) signals. Continuous resonator drive means resonator drive without a separate sense mode for determining back emf. Back-emf is sometimes referenced as BEMF. Rated BEMF means the nominal back-emf voltage BEMFnom that provides a rated vibration at a nominal resonant frequency F0nom. Target BEMF means the back-emf voltage for the given LRA resonant frequency F0 which will provide the same rated vibration as an LRA with BEMFnom at F0nom. Target BEMF is generated by an amplitude/voltage control loop as a variable function of Rated BEMF and the resonant frequency F0 which is generated by an F0 tracking/control loop.

In brief overview, for a resonator system such as a (haptic) LRA, resonant frequency (F0) tracking/control with continuous resonator drive, is based on estimating back-emf, including estimating resonator resistance based at least in part on the sensed resonator drive signals, with back-emf estimated based at least in part on the sensed resonator drive signals and the estimated resonator resistance. A phase difference is detected between the resonator drive signals, and the estimated back-emf signals, generating control for resonator drive frequency, which can be used to iteratively adjust the resonator drive frequency until phase coherent with the estimated back-emf signals (F0 lock), such as for driving the resonator at or near a resonant frequency. An amplitude control loop can be used to iteratively adjust resonator drive amplitude based on a difference between estimated back-emf and a target back-emf derived from a rated back-emf and the resonator frequency resonant frequency.

In an example design, a resonator drive voltage is input to an amplifier. The amplifier drives a voltage across the resonator resulting in a resonator drive current which causes the resonator to vibrate. The F0 control loop uses sensed resonator drive current (Is) and either resonator drive voltage (V) or sensed resonator drive voltage (Vs) to estimate resonator resistance (Re), and to estimate back-emf based on resonator drive, sensed resonator drive current (Is) and resonator drive voltage (either V or Vs), and estimated Re: BEMF=V−Is*Re or BEMF=Vs−Is*Re. The estimated phase difference between the resonator drive voltage and the Estimated BEMF is used to iteratively adjust the frequency of the resonator drive voltage until it is phase coherent with Estimated BEMF (F0 lock). The example design includes an amplitude/voltage control loop to adjust resonator drive voltage based generating a Target BEMF as a variable function of Rated BEMF and the resonant frequency (F0).

For each frequency adjustment iteration, resonator resistance can be estimated in the initial (first or first few) BEMF voltage cycle(s), where the sensed current is dominated by the contribution from resonator resistance, or alternately estimated by inserting a low frequency, low amplitude pilot tone.

Phase difference can be estimated based on BEMF peaks and/or zero crossings. The accuracy of determining BEMF peaks and zero crossing depends on the accuracy of the resonator current sensor, which depends on the sense signal level. Hence, either peaks or zero crossing (or both) can be used depending on whether the resonator current signal level is above a design threshold level for a peak region, or a zero crossing region, or both. For example, zero crossings can be used for estimating relatively large phase difference where the resonator current sense signal is above the design threshold for regions of BEMF zero crossings, peak crossings can be used for estimating relative small phase difference where the resonator current sense signal is above the design threshold for regions of BEMF peak crossing, and both zero and peak crossings can be used for estimating mid-range phase difference where the resonator current sense signal is above the design threshold for regions of both BEMF zero and peak crossing.

An amplitude/voltage control loop can be used to adjust resonator drive amplitude/voltage (for example, to provide uniform haptic feedback) based on determining a target back-emf, as a variable function of rated back-emf and resonator frequency, and generating an amplitude control signal as a difference (error) between target back-emf and estimated back-emf.

Resonator drive can be voltage drive, with the F0 tracking/control loop using sensed resonator current Is and drive voltage V or sensed resonator drive voltage Vs. Alternately, resonator drive can be current drive, with the F0 tracking/control loop using sensed resonator voltage Vs and drive current I or sense resonator current Is.

An example application is an LRA (linear resonant actuator), such as to provide haptic feedback. In addition to LRA resonant frequency tracking/control, resonator drive amplitude tracking/control can be used to normalize drive voltage for constant vibration and acceleration to provide uniform haptic feedback, using a target back-emf which is derived from the rated back-emf and the resonant frequency. For the example LRA application, the Target BEMF can be selected to provide a constant haptic acceleration and vibration.

In example designs, resonant frequency tracking/control based on estimating back-emf (including estimating resonator resistance) according to the Disclosure can be implemented as a fully integrated resonator driver (driving an external resonator, such as an LRA), including sensing, and with dedicated resonant frequency tracking/control (which can be implemented with one or more programmable components). Alternately, in other example designs, the resonator driver circuit, including sensing circuitry, can be integrated with a DSP (and ADC/DAC interface) to implement resonant frequency tracking/control based on estimating back-emf (including estimating resonator resistance). Alternately, in other example designs, a resonator driver controller can be implemented in a DSP or other programmable device, configured for interface to an external resonator driver including sensing, and configured to implement resonator frequency tracking/control based on estimating back-emf (including estimating resonator resistance).

FIG. 1 illustrates an example linear resonant actuator system 10, includes an LRA 30 and LRA drive electronics 20. The example LRA drive electronics 20 includes example resonant frequency tracking/control architecture 100 according to the Disclosure.

LRA drive electronics 20 includes a resonator driver 21 providing a continuous resonator drive voltage 22, coupled to an amplifier 28 which is used to drive the resonator LRA 30. The example LRA/resonator is continuously driven with an adjusted resonator voltage (V). Resonator drive sensor circuitry 120, coupled to the resonator drive output 29 of amplifier 28, senses resonator drive current.

LRA drive electronics 20 includes an adaptive F0 and amplitude tracking/control loop 101, based on estimating back-emf (including estimating resonator resistance) from sensed current Is and either voltage drive V or sensed resonator voltage Vs. Estimated BEMF is used to estimate the phase difference between resonator drive, and Estimated BEMF, iteratively adjusting resonator drive frequency until it is phase coherent with Estimated BEMF (F0 lock). The F0 tracking/control loop, based on estimating back emf, avoids switching between drive and sense modes, where back-emf is sensed (rather than estimated). Effectively, the natural response of the LRA is implicitly derived, instead of being explicitly sensed (using a dedicated back-emf sense mode).

As described in connection with FIGS. 3A-3D, resonator drive voltage amplitude can be adjusted by an amplitude tracking/control loop based on a Target BEMF generated from a Rated BEMF and the resonant frequency (F0), to provide uniform haptic feedback.

The F0 and amplitude tracking/control loop 101 includes a resonator frequency tracking/control block 110 (frequency tracker/controller), and a resonator drive sensor 120. The example LRA drive electronics 20 provides resonator voltage drive 22 to the amplifier 28 to drive the LRA 30. The drive voltage results in resonator current to flow through the LRA and produce vibration by inter-acting with the magnetic field inside the LRA.

The example resonator drive sensor 120 is coupled to the output 29 of amplifier 28, and senses resonator drive current with a current sensor 121, to generate a (feedback) sensed resonator current signal 129I to the frequency tracker/controller 110. Resonator drive sensor 120 also generates a resonator drive voltage signal 129V, which can be the resonator drive voltage 22V (input to amplifier 28) or a sensed resonator drive voltage signal from the output 29 of amplifier 28. Filtering 123 can be used to remove noise, and time-align the current sense signal 129I with resonator drive voltage 129V, and improve SNR (correct determination of peaks and zero-crossings depends on a clean LRA current-sense signal). Similar filtering can also be applied to the resonator drive voltage 129V (feedback or sensed).

The example frequency tracking/control block 110 includes a back-emf estimation block 130, including resonator resistance (Re) estimation block 140, a phase difference detector block 150, a resonator frequency control block 160. Back-emf estimation block 130 includes a back-emf estimator 131. Resonator resistance (Re) estimation block 140 includes an Re estimator 141, and an Re auto-correct/adjuster 143.

The frequency tracker/controller 110 receives, through the back-emf estimation block 130, the sensed resonator current signal 129I, which is input to the back-emf estimator 131, and to the Re estimator 141. Re estimator 141 also receives from resonator drive sensor 120 the resonator drive voltage signal 129V (feedback V or sensed Vs), and generates an estimated Re signal 149.

The example resonator resistance (Re) estimation block 140 includes an adaptive Re adjust block to auto-correct the phase misalignment by adjusting estimated Re based on a (feedback) phase difference measurement (discussed further in connection with FIG. 3A), providing an adjusted estimated Re signal 149A. LRA/resonator resistance Re is estimated in the first cycle, or first few cycles, of the resonator voltage drive (discussed further in connection with FIGS. 5A/5B), using the filtered resonator drive voltage (V) or sensed (filtered) LRA drive voltage (Vs) and sensed (filtered) LRA drive current (Is).

Back-emf estimator 131 receives the (feedback) resonator drive voltage (V input) or sensed (filtered) LRA drive voltage (Vs input) 129V, the (feedback) sensed resonator current signal 129I (Is input), and the adjusted estimated Re, and generates an Estimated BEMF signal 139 (Back-EMF=V−Is*Re or Back-EMF=Vs−Is*Re).

Phase difference detector block 150 receives the resonator voltage signal 129V (feedback or sensed), and the Estimated BEMF signal 139, and determines the phase difference between resonator drive voltage, and Estimated BEMF, and provides a phase difference signal 159.

Resonator frequency control block 160 receives the phase difference signal 159, and provides a (feedback) resonator frequency control signal 169 to the resonator driver 21. Phase difference can be estimated using a zero/peak crossing technique described in connection with FIGS. 7A-7D.

In response to the resonator frequency control signal 169, the resonator driver 21 iteratively adjusts resonator drive frequency of the resonator drive voltage until it is phase coherent with Estimated BEMF, providing F0 lock. The example adaptive F0 tracking/control loop can use a pre-characterized LRA model as an initial condition for iteration.

Figure 2A:
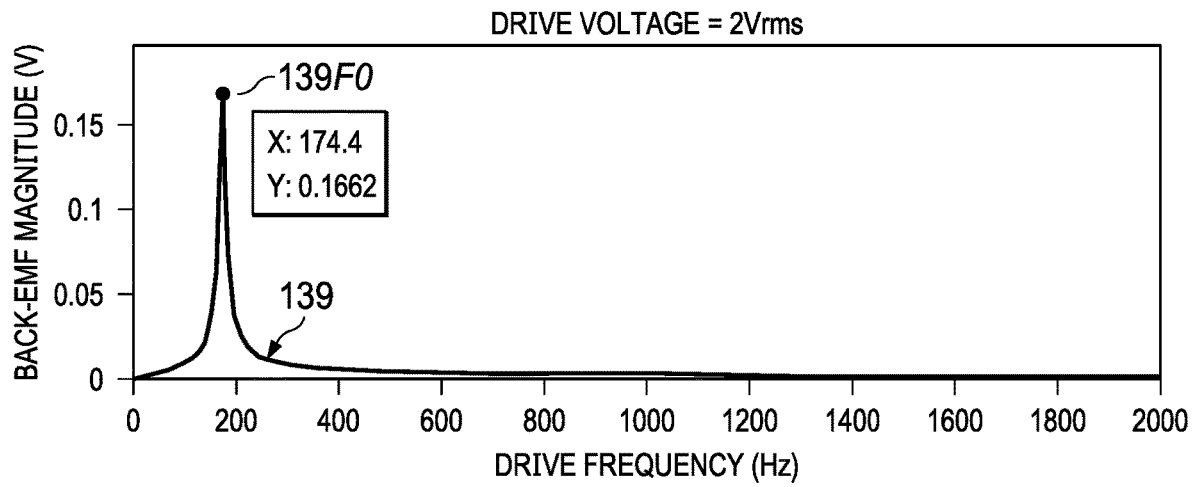
FIGS. 2A-2C provide example frequency domain (frequency and phase) and time domain signal plots illustrating adaptive resonant frequency tracking/control based on estimating back-emf (including estimating resonator resistance), according to the Disclosure.
Figure 2B:
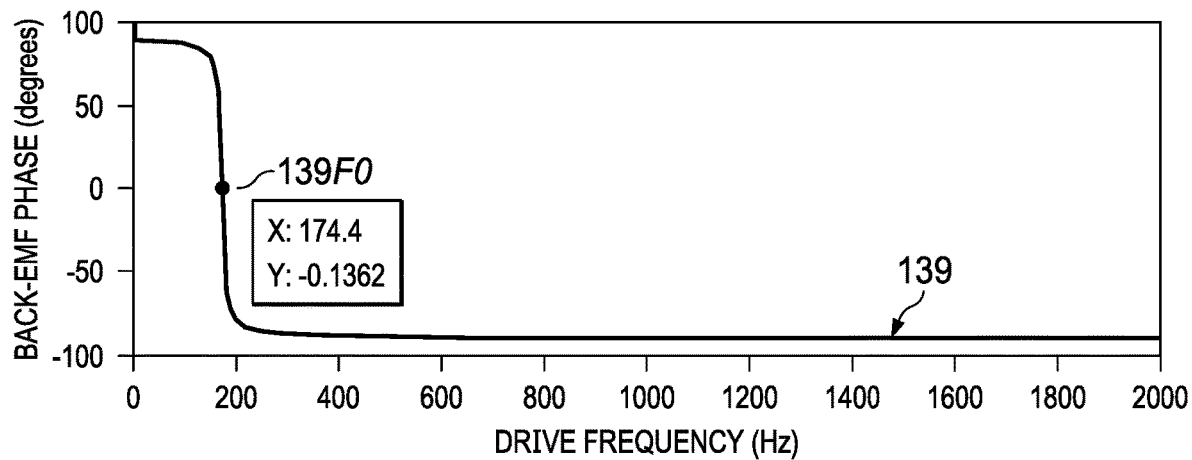
Figure 2C:
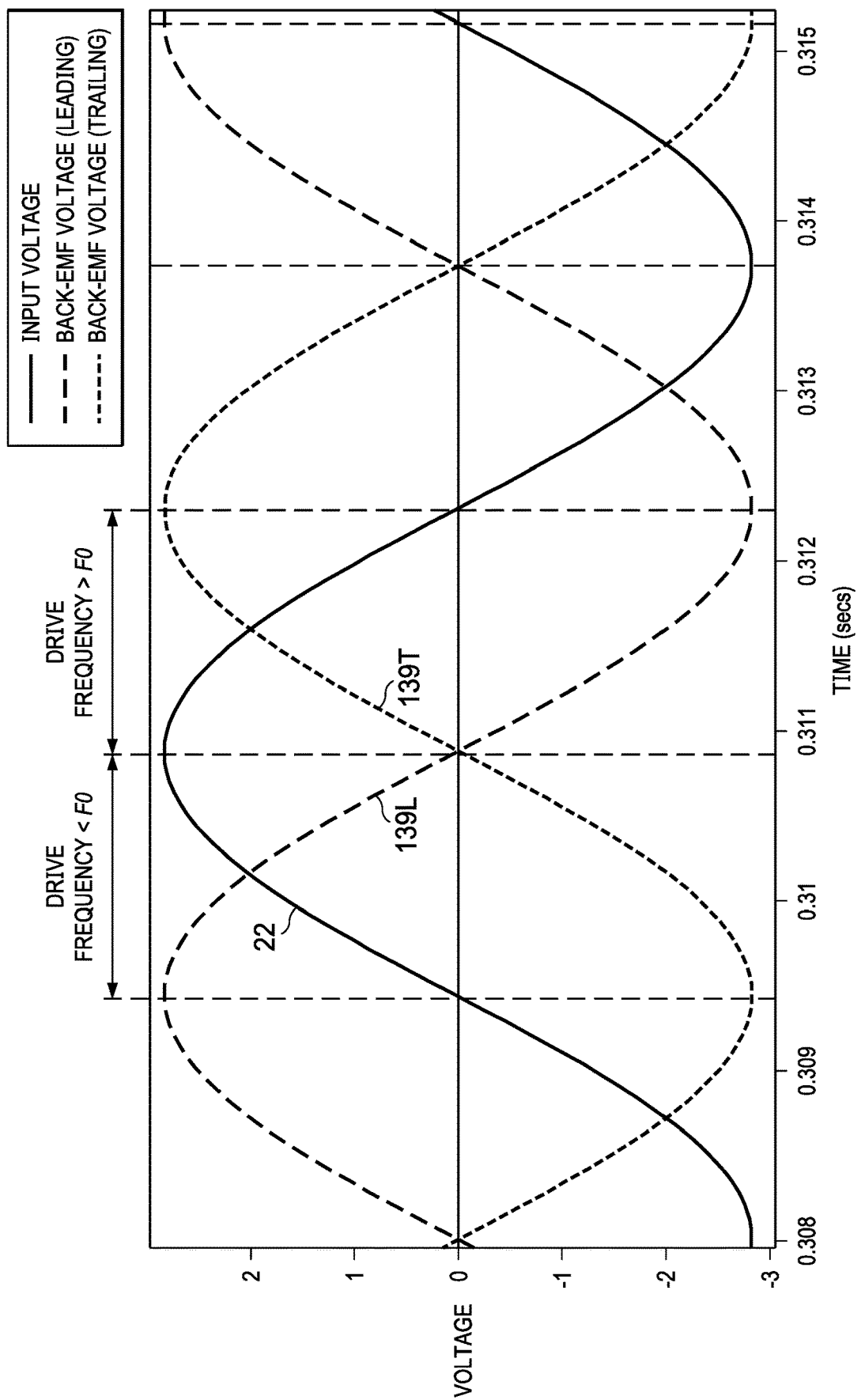

FIGS. 2A-2C providing example signal plots for frequency domain (frequency and phase) and time domain illustrating adaptive resonant frequency tracking/control based on estimating back-emf (including estimating resonator resistance), according to the Disclosure. FIGS. 2A/2B illustrates back-emf magnitude and phase relative to resonator drive frequency, including back-emf frequency and phase at the resonant frequency 139 F0. FIG. 2C illustrates, relative to resonator drive voltage 22, example leading and trailing back-emf waveforms 139L and 139T.

A voltage control loop can be used to alter drive voltage based on a Rated BEMF and the resonant frequency, ensuring that acceleration, and vibration, feedback are constant. Vibration can be normalized to provide uniform haptic feedback, using a target back emf which is derived from the Rated BEMF and the resonant frequency. The Estimated BEMF signal is subtracted from the Target BEMF and the difference signal (error) is multiplied using a gain block and the output of the gain block is used to adjust the amplitude of the voltage drive. The voltage control loop ensures that at steady state the error is zero (or close to zero).

FIGS. 3A-3D illustrate example alternate resonant frequency tracking/control designs based on the resonant frequency tracking/control architecture of FIG. 1, for the example LRA application. Each example design includes an outer amplitude control loop 201 to adjust resonator drive (voltage or current) 22 amplitude, to provide uniform haptic feedback, based on determining a target back-emf, as a variable function of rated back-emf and resonator frequency, and generating an amplitude control signal as a difference (error) between target back-emf and estimated back-emf.

For example designs, the F0 loop operates first to achieve F0 lock, iteratively adjusting resonator drive frequency until it is phase coherent with BEMF. Then, after F0 lock, the amplitude loop operates to generate Target BEMF (from Rated BEMF and the resonant frequency F0), iteratively adjusting resonator drive amplitude based on estimated BEMF (from the F0 loop), and generated Target BEMF (from the amplitude loop). Alternately, the F0 loop and amplitude loop can operate independently, with Target BEMF generated based on Rated BEMF and feedback resonator frequency (from the F0 loop, independent of F0 lock).

An example amplitude control block 210 includes a target back-emf computation block 211, to generate Target BEMF 212 based on Rated BEMF 214 (such as a register value) and the resonant frequency F0. The amplitude control/update block 210 generates the amplitude control signal 219 based on a difference (error) 216 between the Estimated BEMF 239, and the Target BEMF 212.

A gain block 218 provides the amplitude control signal 219 [gain×error(Estimated BEMF−Target BEMF)]. Gain block 218 receives an F0 lock flag 169flg from the F0 loop (resonator frequency control block 160) to indicate when the F0 loop has achieved F0 lock, and then outputs the amplitude control signal 219 to the resonator driver 21.

Figure 3A:
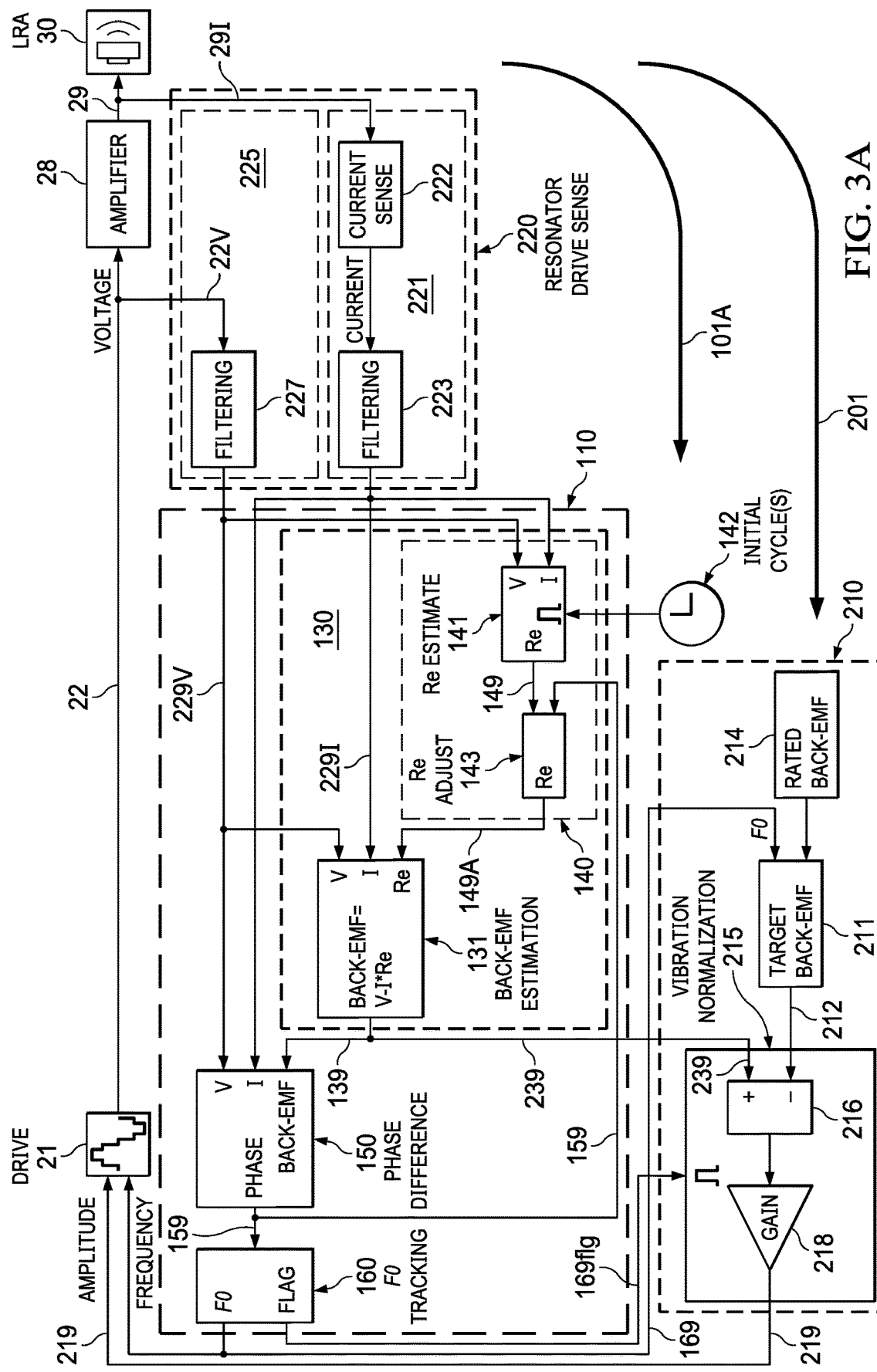
FIGS. 3A-3D illustrate example alternate resonant frequency tracking/control designs based on the resonant frequency tracking/control architecture of FIG. 1, for the example LRA application, each example design including an outer amplitude (voltage) control loop 201 to adjust resonator drive 21/22 amplitude, to provide uniform haptic feedback, based on determining a target back-emf (211), as a variable function of rated back-emf (214) and resonator frequency (169), and generating an amplitude control signal (219) as a difference (error) between target back-emf and estimated back-emf.

FIG. 3A illustrates an example alternate resonant frequency tracking/control loop 101A with resonator drive voltage feedback/filtering 22V/227.

Figure 3B:
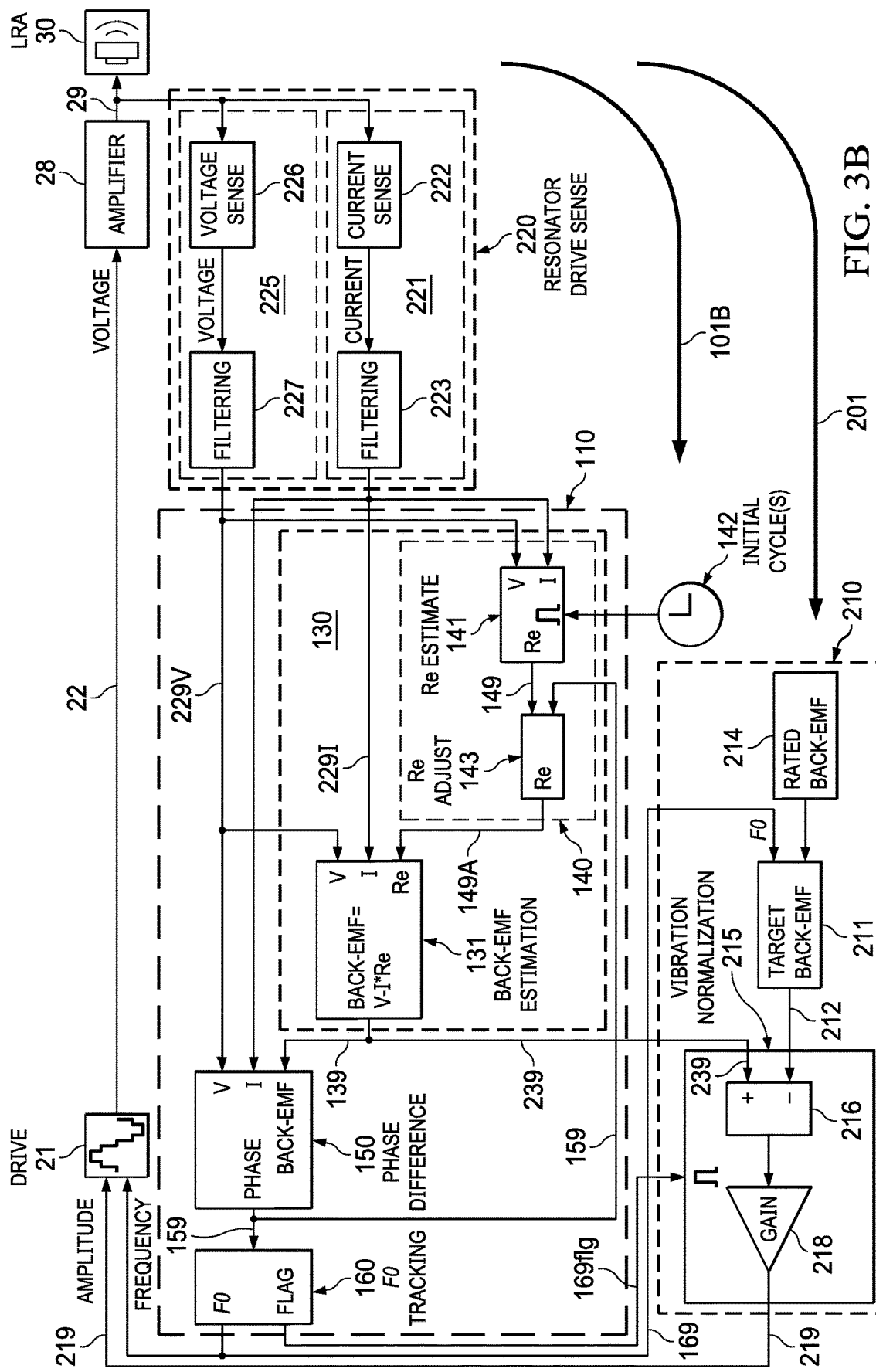

FIG. 3B illustrates an example alternate resonant frequency tracking/control loop 101B with resonator drive voltage sense/filtering 226/227.

Figure 3C:
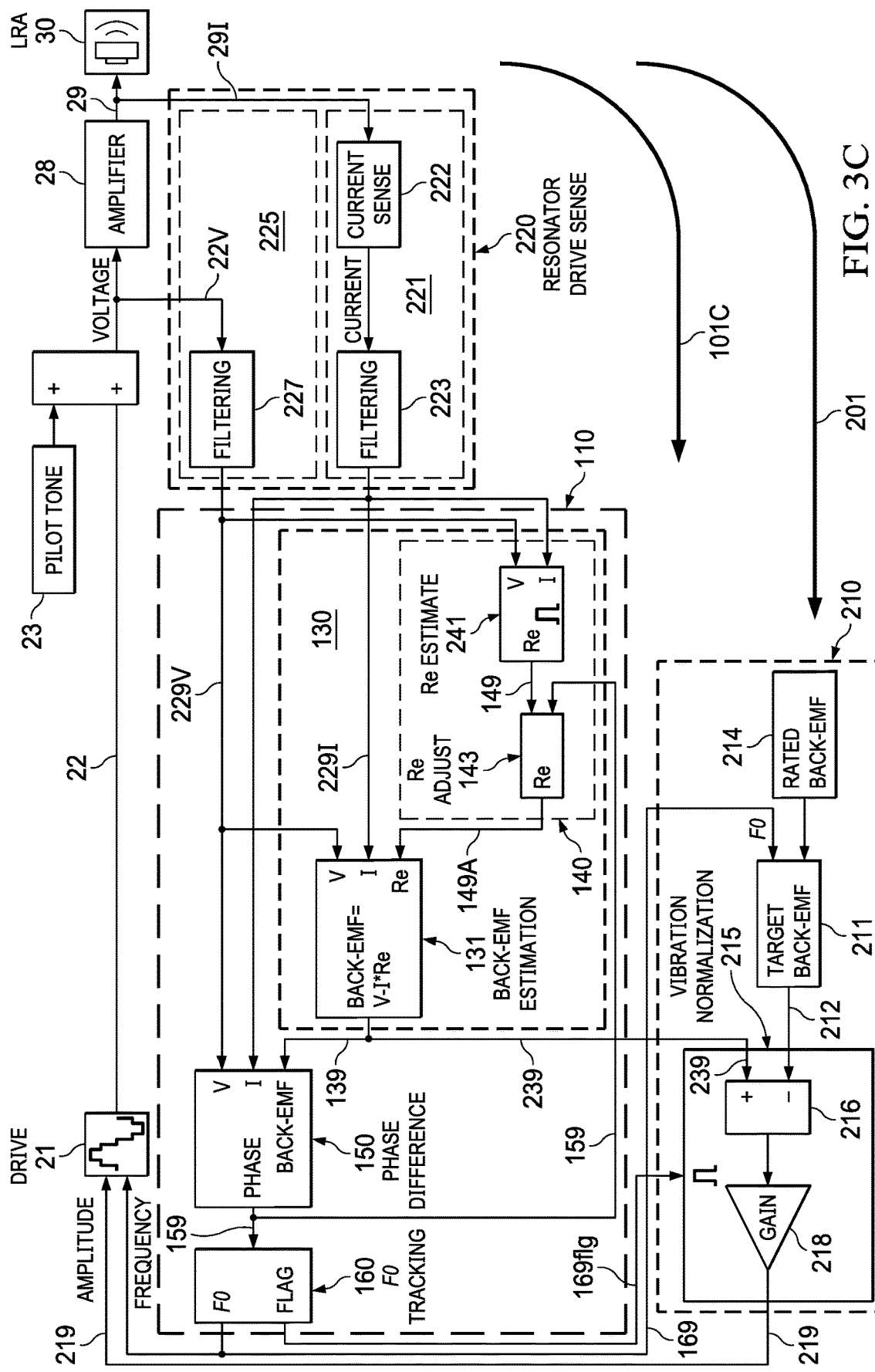

FIG. 3C illustrates an example alternate resonant frequency tracking/control loop 101C with pilot tone insertion 23 for resonator resistance Re estimation 241, and with resonator drive voltage feedback/filtering 22V/227.

Figure 3D:
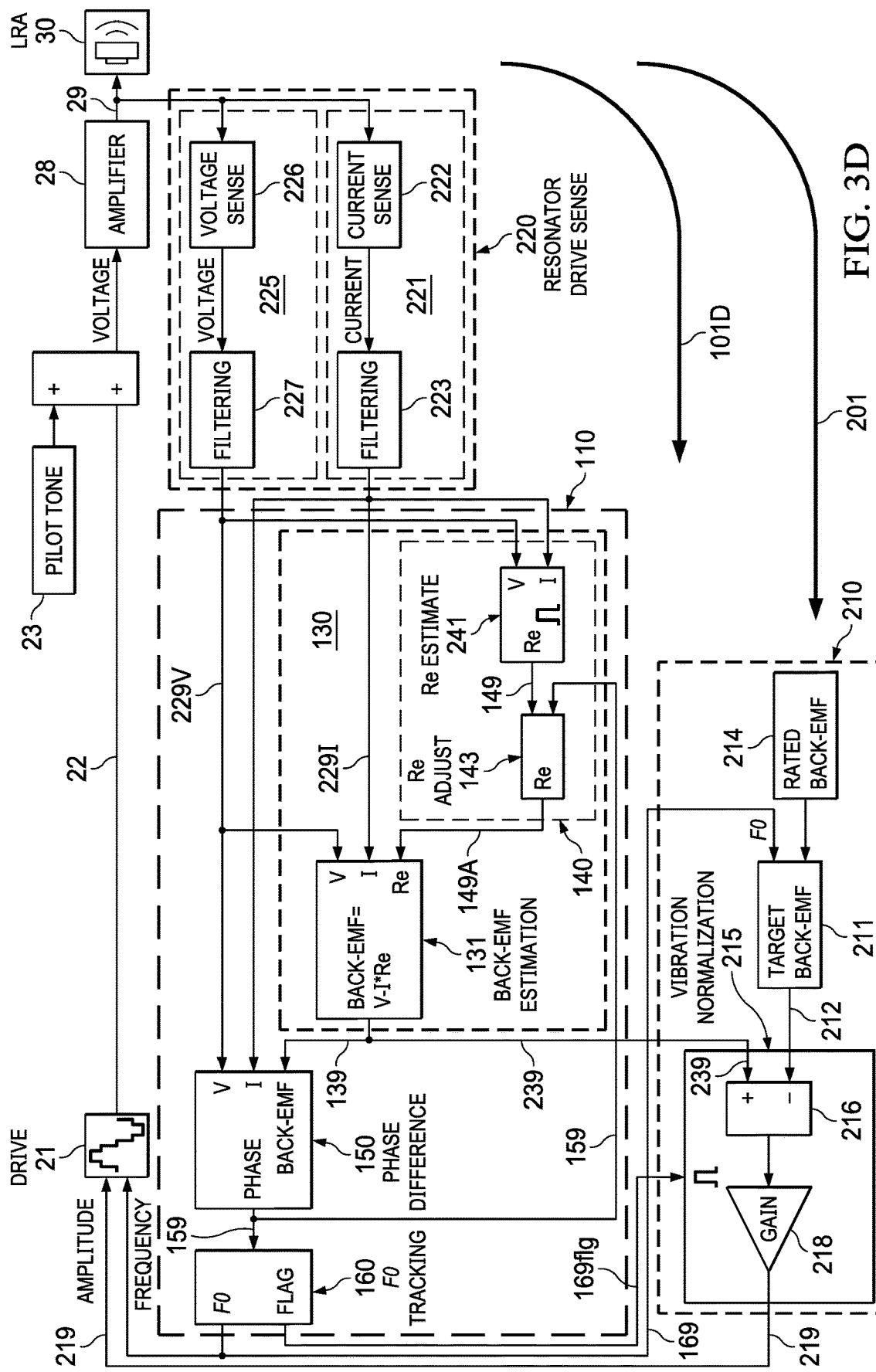

FIG. 3D illustrates an example alternate resonant frequency tracking/control loop 101D with pilot tone insertion 23 for resonator resistance Re estimation 241, and with resonator drive voltage sense/filtering 226/227.

Figure 4:
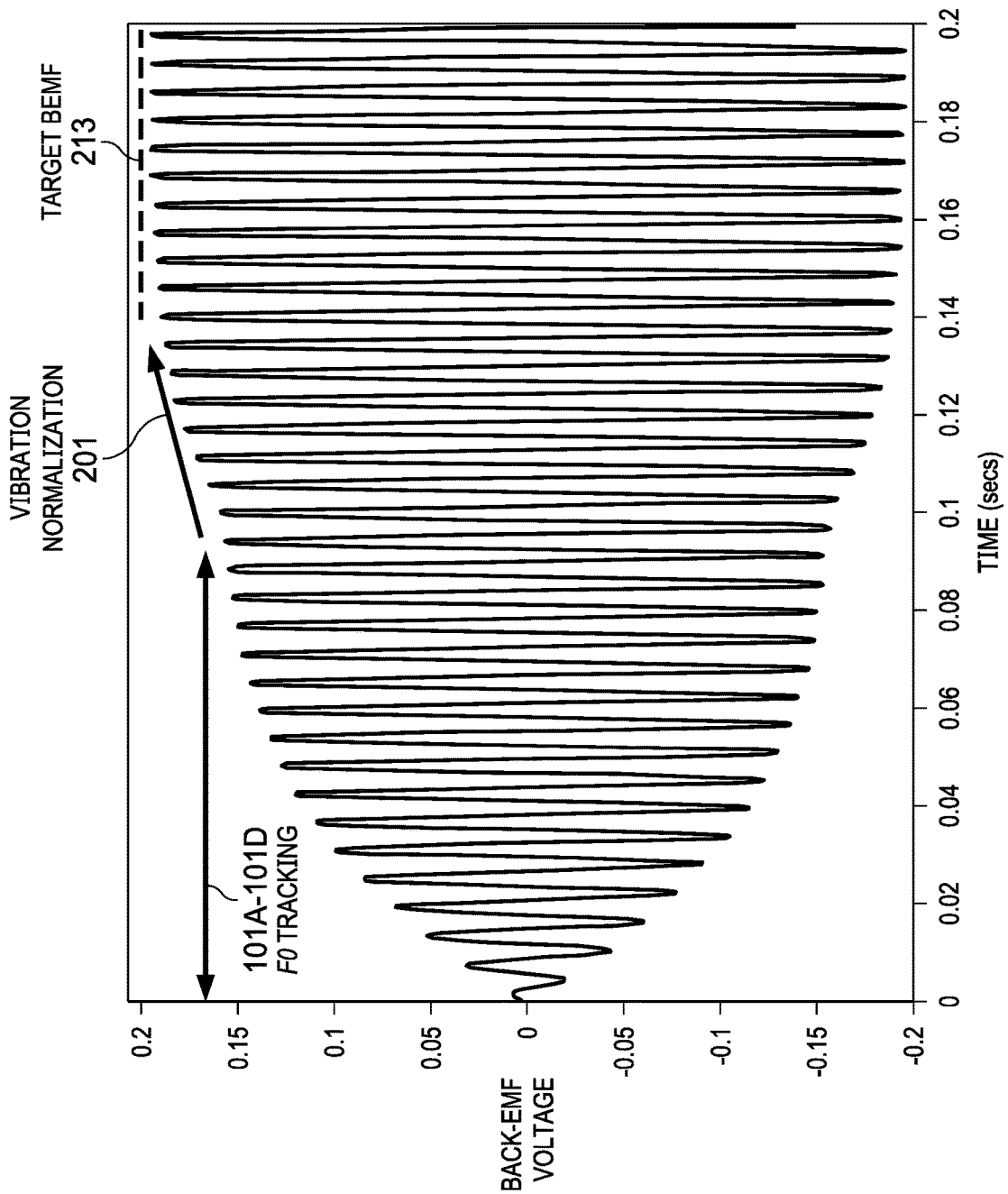
FIG. 4 provides a sample signal plot illustrating the effect of adjusting resonator drive amplitude, to provide uniform haptic feedback, for the alternate resonant frequency tracking/control designs of FIGS. 3A-3D that include an outer amplitude control loop 201 to adjust resonator drive amplitude based on a target back-emf derived from a rated back-emf and the tracked resonator F0 (FIGS. 3A-3D, 213/214).

FIG. 4 provides a sample signal plot illustrating the effect of adjusting resonator drive amplitude, to provide uniform haptic feedback, for the alternate resonant frequency tracking/control designs of FIGS. 3A-3D. As described above, an outer amplitude control loop (201) and amplitude control/update block (210) control (219) resonator drive amplitude (22). Resonator drive amplitude is adjusted by the amplitude control loop in FIGS. 3A-3D, 201), based on a Target BEMF derived from a Rated BEMF, and the tracked resonator F0 (FIGS. 3A-3D, 213/214).

In summary, for the example resonant frequency tracking/control architecture of FIG. 1, including LRA voltage drive coupled to an amplifier driving the LRA, an example resonant frequency F0 and amplitude tracking/control methodology includes:

Drive the LRA at the rated voltage with a sinusoid at a defined frequency F0_int and amplitude. For example, the pre-defined frequency can be based on characterized data of a sample LRA and the amplitude can be the rated voltage of a sample LRA.

Sense LRA drive current and (optionally) LRA drive voltage, for example from a sensing circuit in the amplifier.

Filter the current-sense to remove noise and time-align the current-sense with input voltage. The input voltage can be the drive voltage (V) or the sensed LRA drive voltage (Vs). Similar filtering may also be applied to the drive voltage (V) or the sensed LRA drive voltage (Vs).

Estimate the resistance of the LRA by doing a V/I estimate in the first voltage cycle (or first few voltage cycles).

$$Re\_est = \frac{\sum V \times I}{\sum I \times I}.$$

Alternatively, the resistance of the LRA can be estimated by inserting a low frequency, low amplitude pilot tone.

Estimate Back-EMF, $V_{BEMF\_est} = V - I \times R_{e\_est}$

Sample the Back-EMF only when the sense-current is above a threshold (current-sensing can be inaccurate when the current flowing through the LRA is below a design threshold).

Determine the time position of the sampled Back-EMF corresponding to: (a) Zero-crossing—when the phase difference between F0 and F0_init is relatively large (because the current-sensing signal is above the design threshold at regions of zero-crossing); (b) Peak-crossing—when the phase difference between F0 and F0_init is relatively small (because the current-sensing signal is above the design threshold at regions of peak-crossing); and (c) Both zero-crossing and peak-crossing are detected when the phase difference between F0 and F0_init is mid-range (because the current-sensing signal is above the design threshold at regions of both zero-crossing and peak-crossing)

Measure the phase difference between zero/peak-crossing of Back-EMF and input voltage, $\Phi = V(\text{crossing}) - V_{BEMf}(\text{crossing})$ Adjust $R_{e\_est}$ if there is mis-alignment in $\Phi$ Else, Update the F0 estimate based on the following updated equation:

$$F0est(n) = F0est(n-1) \times \frac{\tan\Phi + \sqrt{(\tan\Phi)^2 + 4Q_{ts}^2}}{2Q_{ts}}$$

where $Q_{ts}$=mechanical Q factor of the LRA and is estimated based on a pre-characterized model of a sample LRA.

Drive the LRA at the rated voltage with the sinusoid frequency updated to F0(n).

Derive a Target BEMF based on a Rated BEMF and F0. Calculate the difference between the Target BEMF and the Estimated BEMF (error) and multiply the error signal with a gain (error×gain), and adjust the amplitude of the input voltage based on the error signal.

The F0 tracking/control operations in [0049-59] are performed in the F0 tracking/control loop (FIG. 1, 101; FIGS. 3A-3D, 101A-101D), and the amplitude tracking/control operations [0060] are performed in the amplitude tracking/control loop (FIGS. 3A-3D, 201). For the example designs of FIGS. 3A-3D, the F0 loop operates first to achieve F0 lock, iteratively adjusting resonator drive frequency until it is phase coherent with BEMF. Then, after F0 lock (F0 lock flag 169flg), the amplitude loop operates to generate Target BEMF (from Rated BEMF and F0), iteratively adjusting resonator drive amplitude based on generated BEMF (in the F0 loop) and generated Target BEMF (in the amplitude loop). Note that operating the F0 loop and amplitude loop sequentially is not required, and these loops can operate independently, with Target BEMF generated based on Rated BEMF and feedback resonator frequency (from the F0 loop, independent of F0 lock).

Figure 5B:
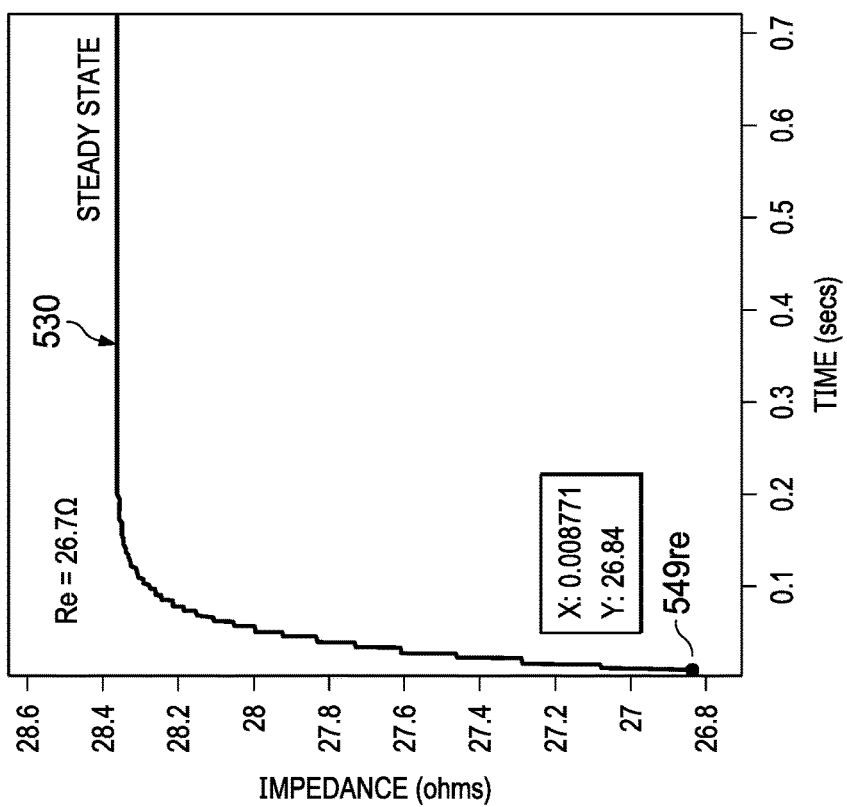
FIGS. 5A-5B provide example signal plots illustrating, for the adaptive resonant frequency tracking/control architecture of the Disclosure, estimating resonator resistance Re in the first few resonator drive cycles, where the sensed resonator drive is dominated by the contribution from resonator resistance Re.
Figure 5A:
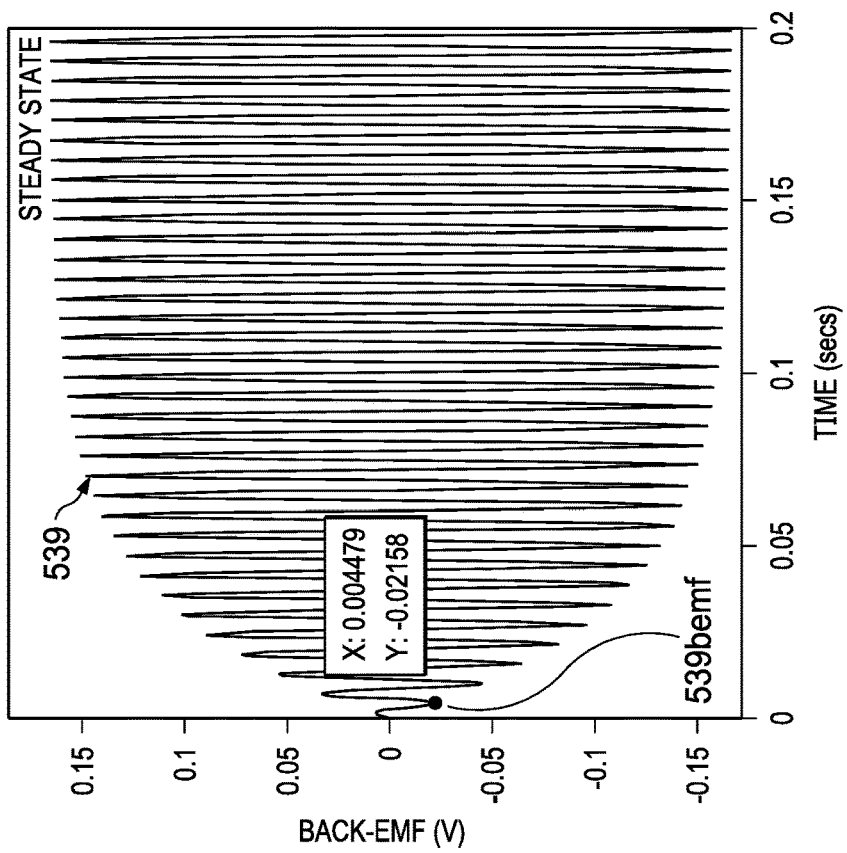

FIGS. 5A-5B illustrate advantages of estimating resonator resistance Re in the first few resonator drive cycles: FIG. 5A illustrates back-emf 539 including 539bemf and FIG. 5B illustrates total impedance 530 including 549re. At the end of the first cycle, back-emf 539bemf can be in the range of 13% of steady-state 539. FIG. 5B illustrates total impedance including Re. The total impedance can be nearly equal to Re (in the range of 99.5%) during the initial cycle 549re.

When an LRA/resonator is excited at or near the resonance frequency, the back-emf build up takes some time due to mechanical inertia. So, in the first few cycles, the current in the LRA circuit is dominated by the contribution from Re. Subsequently, as back-emf increases, the LRA drive current (sensed Is) decreases and settles to a lower value due to the additional contribution from the LRA back-emf.

So, for the example LRA F0 and amplitude tracking/control architecture, dc resistance of the LRA can be estimated by measuring V/I in the first few cycles, according to:

$$\frac{\sum V \times I}{\sum I \times I}$$

with a summation of V×I and I×I measurements used to filter out any reactive leakage component in the circuit. Alternatively, the dc resistance (=V/I) can also be measured using $$\frac{\sum \text{abs}(V)}{\sum \text{abs}(I)}$$

if there is none or negligible contribution from any reactive circuit. Alternatively the dc resistance can also be measured by inserting a low frequency, low amplitude pilot tone. Since the pilot tone frequency is very low (close to DC), the measurement of dc resistance based on the low frequency component of V and I is very accurate and very close to the dc resistance value.

FIG. 6 provides example signal plots illustrating, for implementations of the adaptive resonant frequency tracking/control architecture of the Disclosure, phase error due to inaccurate resonator resistance Re estimation, which can be corrected by adaptive Re auto-correction (FIG. 1 and FIGS. 3A-3D, 143), including illustrating resonator drive voltage 622, together with estimated back-emf 649est, and actual back-emf 649actual (both normalized relative to the drive voltage), where 649actual is within a valid phase range, and 649est is outside the valid phase range due to error in Re estimation. An incorrect estimate of Re results in an incorrect estimate of the phase difference between Estimated BEMF and LRA drive voltage:

$$\frac{V_{BEMF\_est}}{V} = \left(1 - \frac{Re\_est}{Re}\right) + \frac{Re\_est}{Re} \times \frac{V_{BEMF}}{V}$$

$V_{BEMF}$=Actual Back-EMF
$V_{BEMF\_est}$=Estimated Back-EMF
Re=Actual Resistance
Re_est=Estimated Resistance
V=Drive Voltage $$\left(1 - \frac{Re\_est}{Re}\right)$$

is the "reflection" of the input voltage due to incorrect $R_e$ estimation

When Re_est>Re, the phase of $V_{BEMF\_est}$ gets reversed due to negative sign of $$\left(1 - \frac{Re\_est}{Re}\right)$$

To correct the phase misalignment, Re_est can be decreased (auto-corrected) until the measured phase satisfies the valid phase conditions. The adaptive Re auto-correction is able to improve the Re measurement accuracy and eliminate the phase error.

Figure 7A:
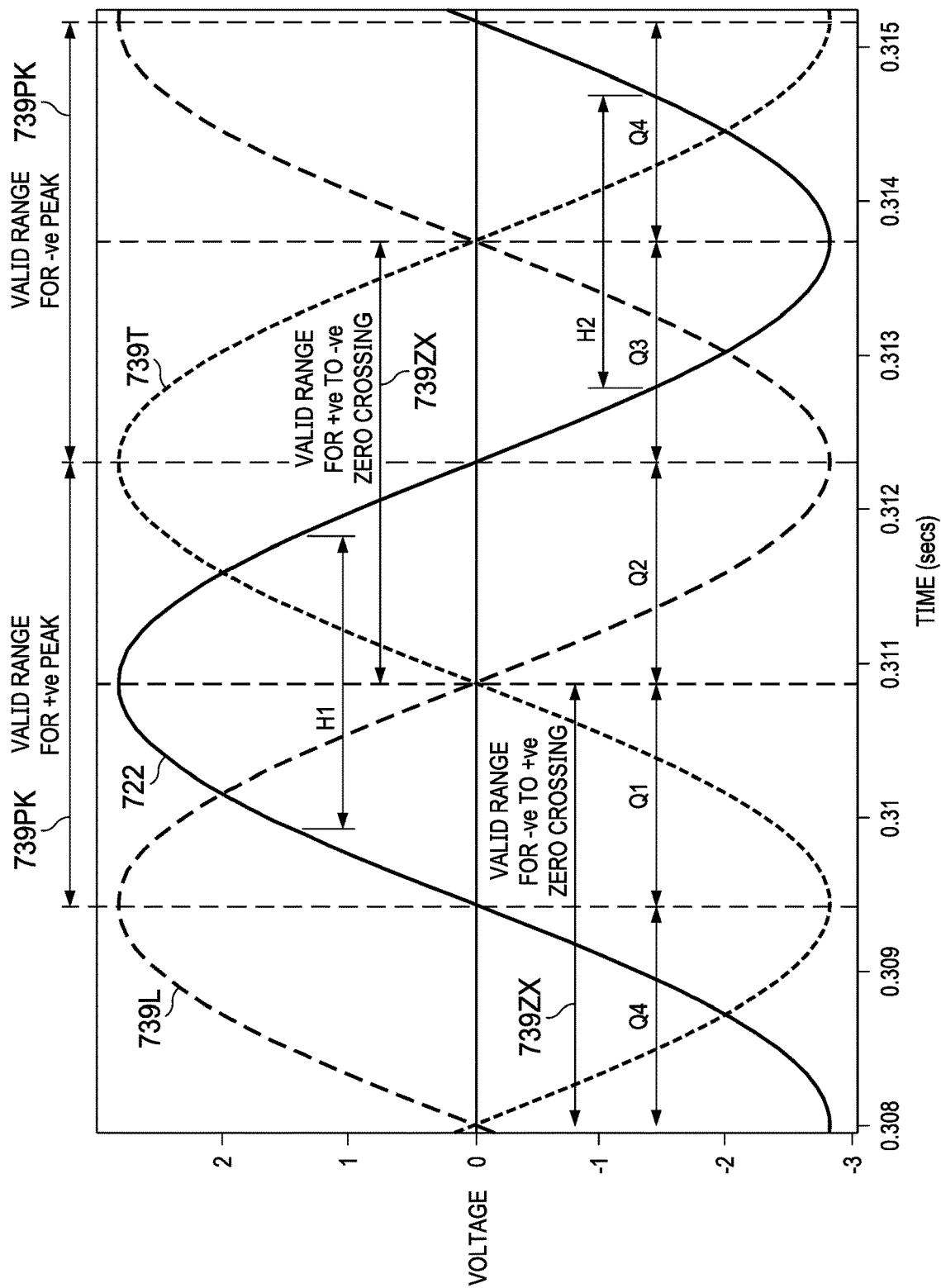
FIGS. 7A-7D provide example signal plots to illustrate the use of BEMF peak/zero crossings 739PK/739ZX (positive/negative), relative to sensed resonator current thresholds 729Ith (positive/negative), to estimate phase difference between resonator drive voltage 722, and estimated back-emf 739L/739T, recognizing that current sensing performance is more accurate when the current sense signal is greater in magnitude than a design-specified current threshold.
Figure 7B:
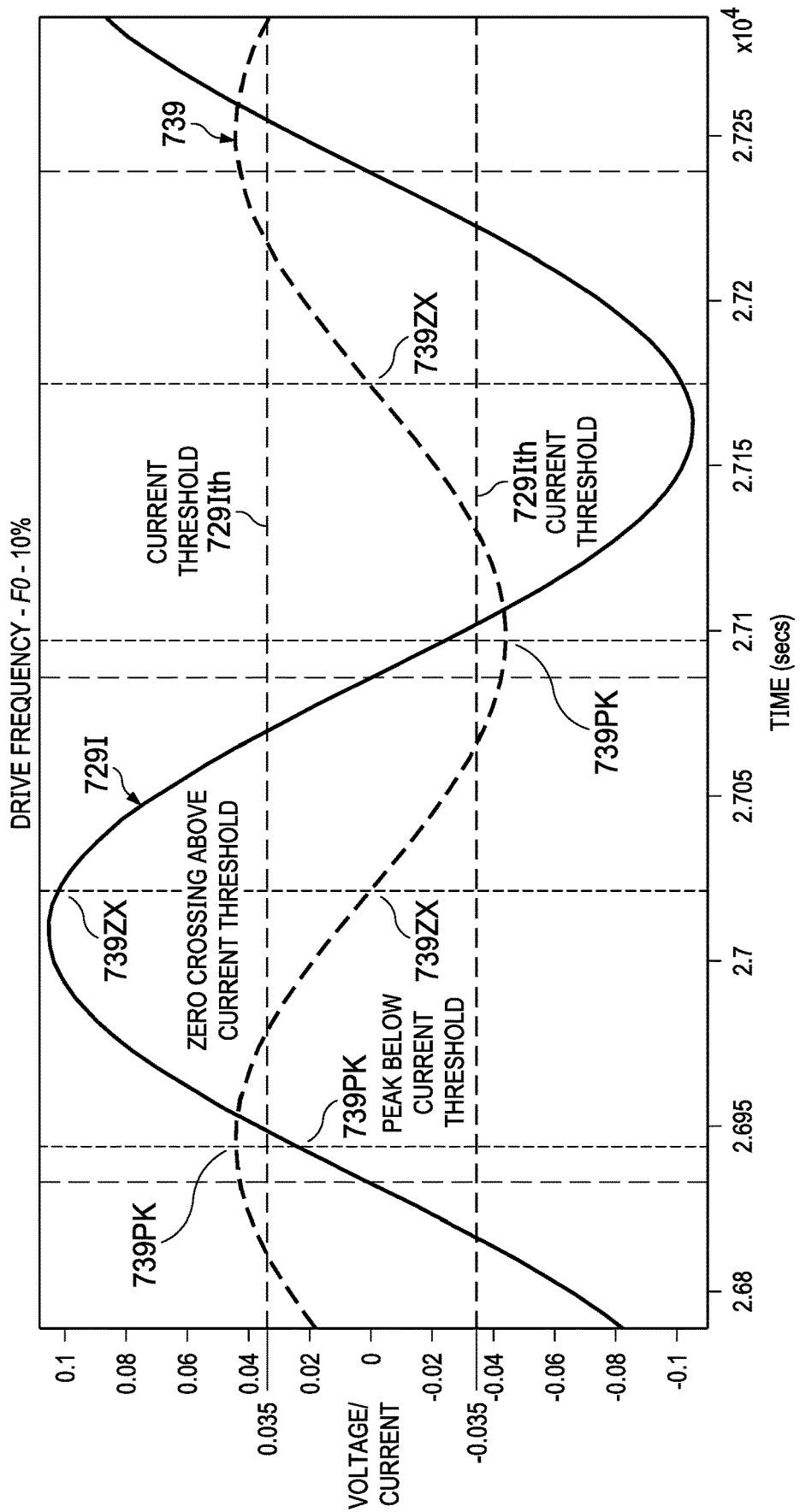
Figure 7C:
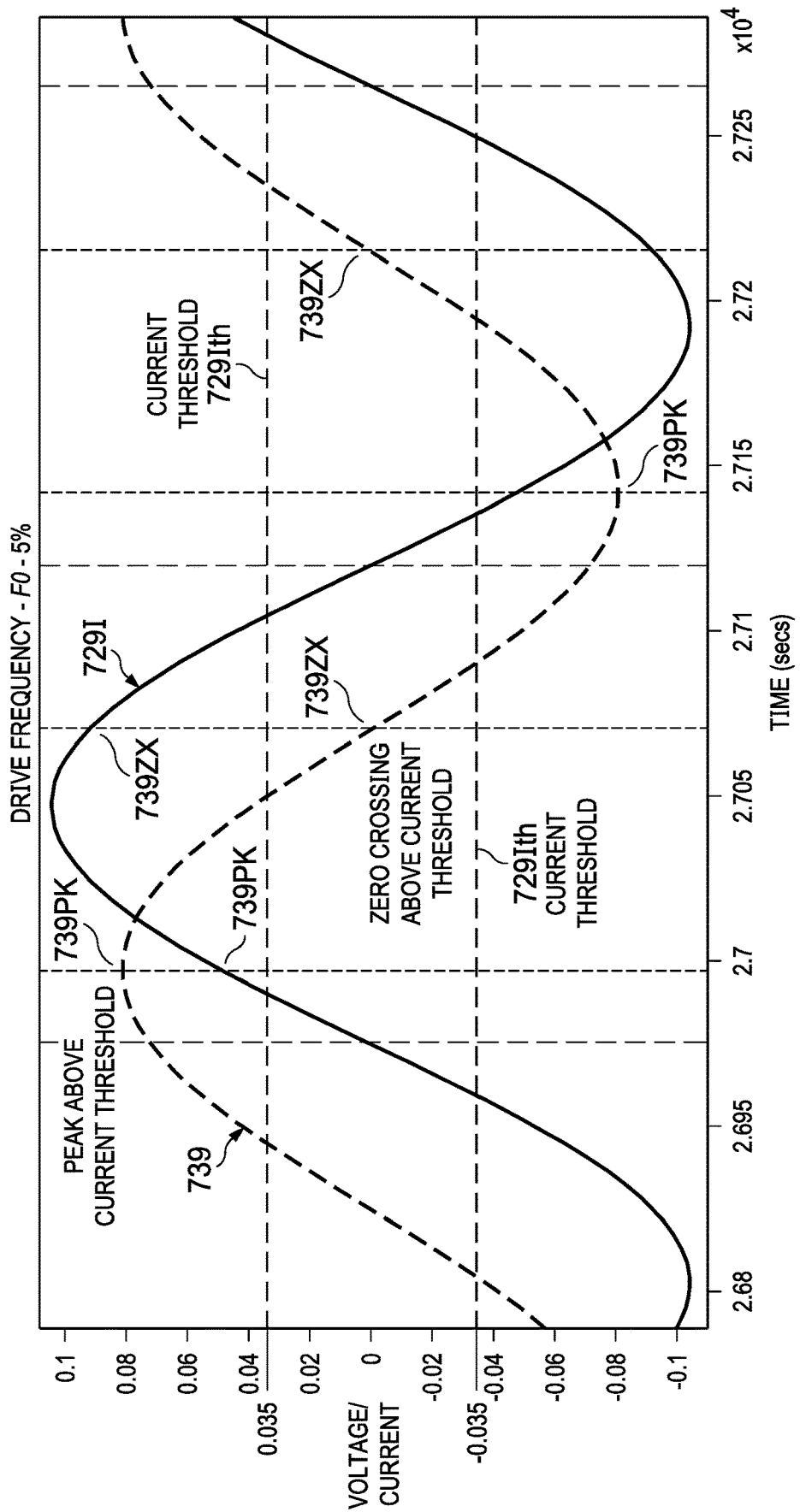
Figure 7D:
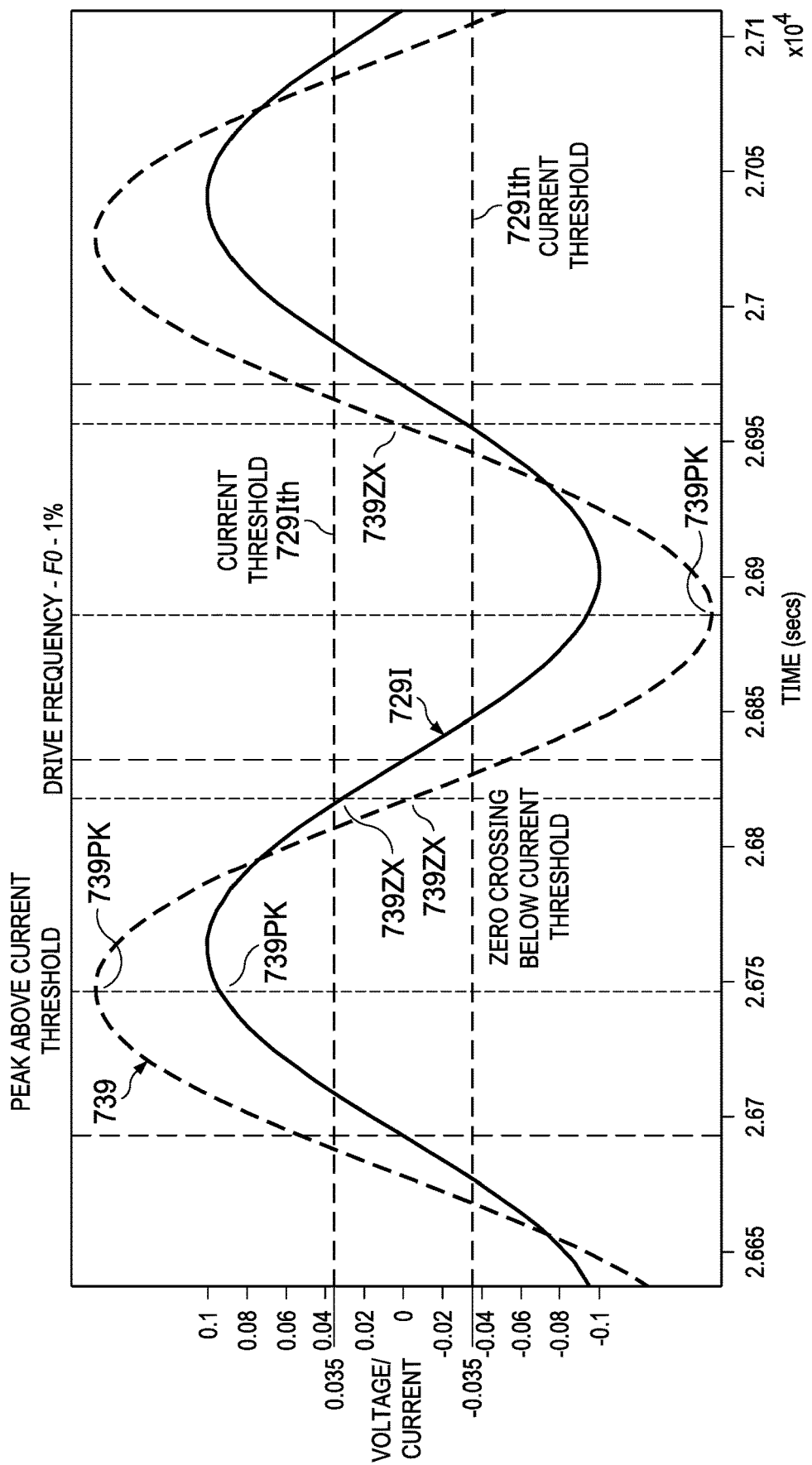

FIGS. 7A-7D provide example signal plots to illustrate the use of BEMF peak/zero crossings 739PK/739ZX (positive/negative), relative to sensed resonator current thresholds 729Ith (positive/negative), to estimate phase difference between resonator drive voltage 722, and estimated back-emf 739L/739T, recognizing that current sensing performance is more accurate when the current sense signal is greater in magnitude than a design-specified current threshold. FIG. 7B-7D are used to measure phase i.e. whether peak or zero-crossing will be used. Once phase is measured, FIG. 7A is used to determine if the phase is valid. If measured phase is valid then F0 is updated, otherwise Re is auto-corrected.

FIG. 7A provides example signal plots illustrating resonator drive voltage 722, and example phase difference waveforms based on estimated back-emf, leading 739L and trailing 739T, including indicating valid ranges of back-emf for positive/negative peak detection 739PK, and valid ranges for positive-to-negative and negative-to-positive zero crossing 739ZX, which can be used for Re auto-correction within the F0 tracking/control loop (FIGS. 3A-3D, 143), and which methodology is summarized in the Detailed Description in connection with Table 1.

Table 1 provides relationships between phase difference and peak/zero crossing, where: (a) Phase difference between back-emf and drive voltage is between $-\pi/2$ and $\pi/2$; and (b) Measured phase difference can be used to determine the accuracy of back-emf estimation, and to provide auto-correction of $R_{e\_est}$. Different phase conditions are:

| Back-EMF | Voltage | Phase condition |
|---|---|---|
| Zero-crossing, +ve to −ve | +ve Half cycle, 1$^{st}$ quarter (Q1) | Auto correction required |
| Zero-crossing, +ve to −ve | +ve Half cycle, 2$^{nd}$ quarter (Q2) | OK |
| Zero-crossing, +ve to −ve | −ve Half cycle, 1$^{st}$ quarter (Q3) | OK |
| Zero-crossing, +ve to −ve | −ve Half cycle, 2$^{nd}$ quarter (Q4) | Auto correction required |
| Zero-crossing, −ve to +ve | +ve Half cycle, 1$^{st}$ quarter (Q1) | OK |
| Zero-crossing, −ve to +ve | +ve Half cycle, 2$^{nd}$ quarter (Q2) | Auto correction required |
| Zero-crossing, −ve to +ve | −ve Half cycle, 1$^{st}$ quarter (Q3) | Auto correction required |
| Zero-crossing, −ve to +ve | −ve Half cycle, 2$^{nd}$ quarter (Q4) | OK |
| Peak-crossing, +ve | +ve Half cycle (H1) | OK |
| Peak-crossing, +ve | −ve Half cycle (H2) | Auto correction required |
| Peak-crossing, −ve | +ve Half cycle (H1) | Auto correction required |
| Peak-crossing, −ve | −ve Half cycle (H2) | OK |

FIG. 7B illustrates an example use of zero crossings 739ZX to estimate phase difference for [drive frequency=F0−10%], because the sensed resonator current exceeds the current thresholds only in the zero-crossing regions 739ZX of the back-emf 739. FIG. 7C illustrates an example use of both peak and zero crossing 739PK/739ZX to estimate phase difference for [drive frequency=F0−5%] because the sensed resonator current exceeds the current thresholds both in the peak and zero-crossing regions 739PK/739ZX of the back-emf 739. FIG. 7D illustrates use of peak crossings 739PK to estimate phase difference for [drive frequency=F0−1%] because the sensed resonator current exceeds the current thresholds only in the peak region 739PK of the back-emf 739.

Note that these figures are just illustrations of how BEMF peak and/or zero-crossing can be used to measure phase, based on resonator drive current relative to current thresholds (positive/negative). For example, the phase detector can be activated as soon as the resonator current sensor signal exceeds the current thresholds. Once the detector is activated, it looks for both peak and zero crossing events. In examples such as 7B it will only register the zero crossing event. In 7C it will register both zero and peak crossing events. In 7D it will register only peak crossing events.

The transfer function of back-emf to input voltage is:

$$\frac{V_{BEMF}(s)}{V(s)} = \frac{Bl^2}{MmsRe} \times \frac{s}{s^2 + s\dfrac{\omega_0}{Q_{ts}} + \omega_0^2},$$

-continued $$\omega_0 = \frac{1}{\sqrt{MmsCms}}, \quad Q_{ts} = \frac{1}{\left(Rms + \frac{Bl^2}{Re}\right)}\sqrt{\frac{Mms}{Cms}}$$

Mms=Moving Mass
Cms=Compliance=1/Spring Constant
Rms=Damping Factor
Bl=Force Factor
Re=dc resistance of the LRA coil
$\omega_0$=Resonance frequency
$Q_{ts}$=Mechanical Q-factor Phase at frequency = $\omega$, $$\Phi = \begin{cases} \frac{\pi}{2} - \tan^{-1}\frac{\frac{\omega\omega_0}{Q_{ts}}}{\omega_0^2 - \omega^2}, & \omega \le \omega_0 \\ -\frac{\pi}{2} - \tan^{-1}\frac{\frac{\omega\omega_0}{Q_{ts}}}{\omega_0^2 - \omega^2}, & \omega > \omega_o \end{cases}$$

By measuring the phase difference between the peak/zero-crossing of the LRA back-emf and the LRA drive voltage, and knowing the frequency of the LRA drive voltage ($\omega$), $\omega_0$ (i.e. $f_0$) can be iteratively tracked until it is phase coherent with Estimated BEMF, achieving F0 lock. For example, if the phase difference is positive, then the frequency of the drive voltage is less than $f_0$, so the drive frequency has to be increased, and if the phase difference is negative, then the frequency of the drive voltage is greater than F0, so the drive frequency has to be decreased.

An alternate method for iteratively updating F0 is:

$$\text{For } \omega \le \omega_0, \Phi = \frac{\pi}{2} - \tan^{-1}\frac{\frac{\omega\omega_0}{Q_{ts}}}{\omega_0^2 - \omega^2}, \text{ i.e. } \tan\Phi = \frac{\omega_0^2 - \omega^2}{\frac{\omega\omega_0}{Q_{ts}}} \quad (i)$$

$$\text{For } \omega > \omega_0, \Phi = -\frac{\pi}{2} - \tan^{-1}\frac{\frac{\omega\omega_0}{Q_{ts}}}{\omega_0^2 - \omega^2}, \text{ i.e. } \tan\Phi = \frac{\omega_0^2 - \omega^2}{\frac{\omega\omega_0}{Q_{ts}}}$$

$$\text{Solving for } \omega_0 = \omega\frac{\tan\Phi + \sqrt{(\tan\Phi)^2 + 4Q_{ts}^2}}{2Q_{ts}}$$

At every back-emf peak or every back-emf zero-crossing (i.e. every half cycle), F0 is updated based on equation (i), which converges to F0 lock. This alternate update methodology converges very fast to the final solution. The update equation depends on Qts which is initialized based on a pre-characterized sample LRA. Convergence and accuracy of the alternate update methodology is robust to Qts variations.

Figure 8A:
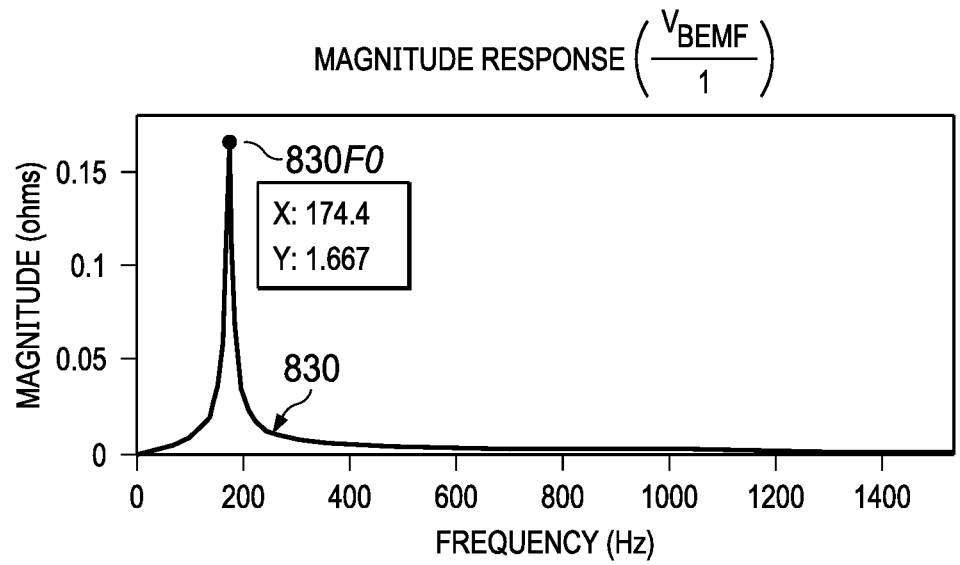
FIGS. 8A-8D provide example signal plots for a design example illustrating adaptive F0 tracking/control based on the resonant frequency tracking/control architecture of the Disclosure.
Figure 8B:
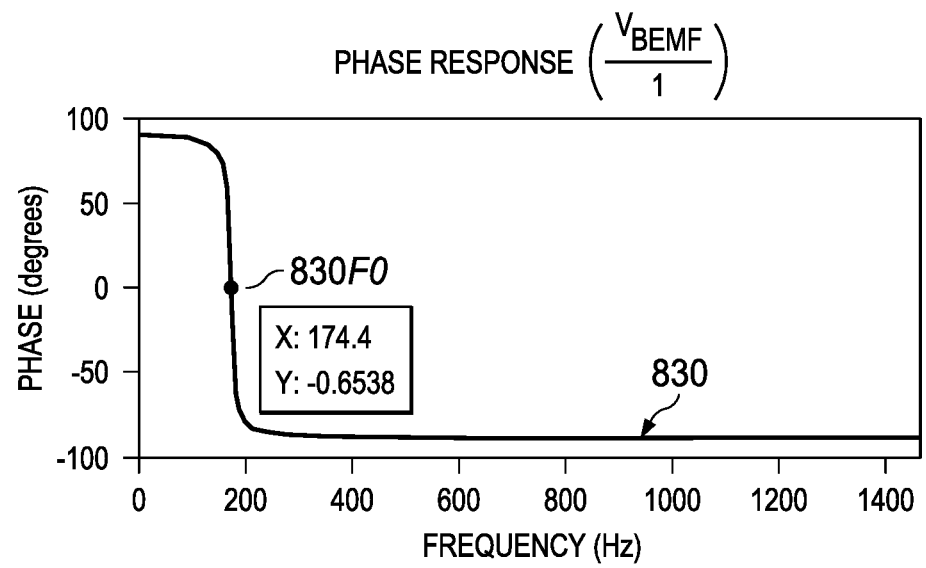
Figure 8C:
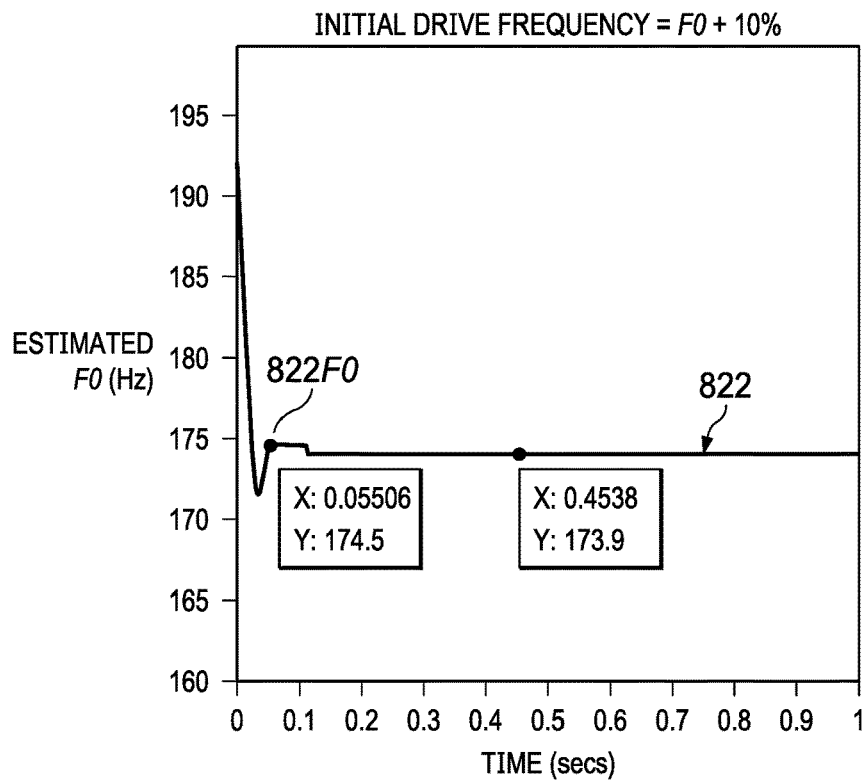
Figure 8D:
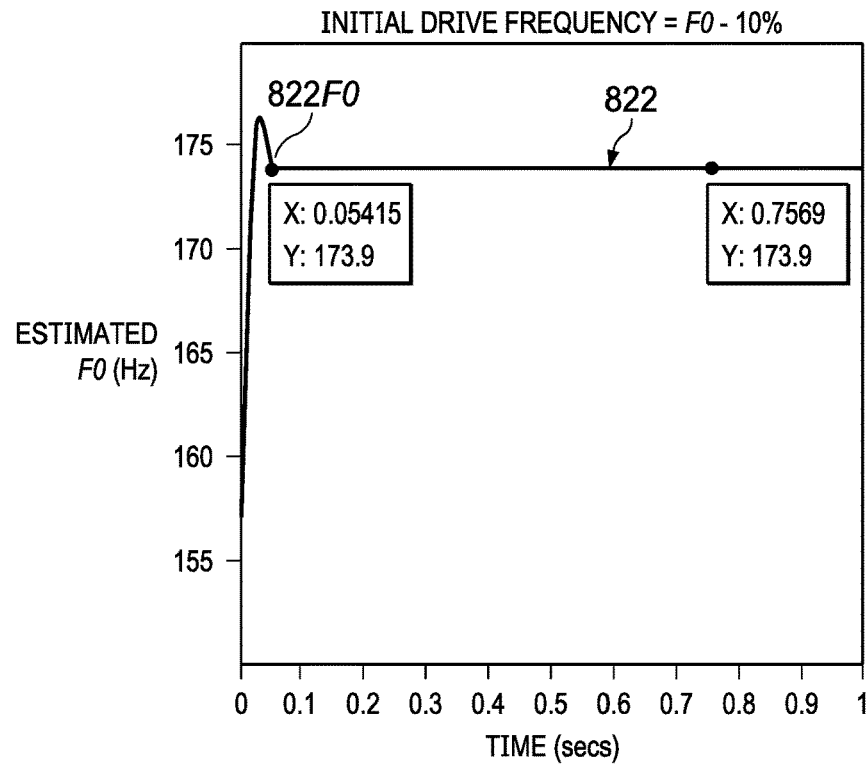

FIGS. 8A-8D provide example signal plots for a design example illustrating F0 and amplitude tracking and control based on the resonant frequency tracking/control architecture according to the Disclosure. Design example results are:
Test LRA Specs:
Mms=0.1 gm
Cms=1/120 m/N
Rms=0.006 N-s/m
Bl=0.1 Tm
Re=26.7Ω
F0=174.4 Hz.
Qts=17.18
Peak Back-EMF=1.667Ω
Drive Voltage=2 Vrms sinusoid FIGS. 8A-8B illustrate the magnitude and phase response of the resonator impedance induced due to back-emf resonator impedance (VBEMF/I), including response at the resonant frequency 830 F0. FIGS. 8C-8D illustrate the convergence of adaptive F0 tracking/control when the initial driver frequency is +/−10% above/below the resonant frequency F0.

Advantages of the resonant frequency and amplitude tracking/control architecture including adaptive F0 tracking/control loop based on Estimated BEMF include: Continuous resonator drive enables optimizing efficiency and acceleration; Resonator drive amplitude can be normalized, for example to normalize LRA vibration to provide uniform haptic feedback; Mechanical noise is minimized because there is no ON-OFF switching of the drive voltage (between drive and sense modes).

The Disclosure provided by this Description and the Figures sets forth example designs and applications illustrating aspects and features of the invention, and does not limit the scope of the invention, which is defined by the claims. Known circuits, connections, functions and operations are not described in detail to avoid obscuring the principles and features of the Disclosed example designs and applications. This Disclosure can be used by ordinarily skilled artisans as a basis for modifications, substitutions and alternatives, including adaptations for other applications.

The invention claimed is:

1. A circuit for determining a frequency for driving a resonator, comprising:
    resonator drive circuitry having a first input, a second input and an output wherein the first input is coupled to an amplitude control signal and the second input is coupled to a frequency control signal;
    an amplifier having an input and an output wherein the input is coupled to the output of the resonator drive circuitry and the output of the amplifier is directly coupled to an output of the circuit for driving a resonator, where the output of the circuit for driving a resonator is configured to drive a resonator;
    sense circuitry having an input, first output and a second output wherein the sense circuit input is directly coupled to the output of the amplifier, wherein the sense circuitry determines the voltage and current at the output of the amplifier;
    a frequency tracker/controller having a first input, a second input, a first output, a second output and a third output wherein the first input is coupled to the first output of the sense circuitry, the second input is coupled to the second output of the sense circuitry and the first output is coupled to the first input of the resonator drive circuitry; and
    an amplitude control circuitry having a first input, a second input, a third input and an output wherein the first input is coupled to the output of the amplifier, the second input is coupled to the second output of the frequency tracker/controller, the third input is coupled to the third output of the frequency tracker/controller and the output of the amplitude control circuit is coupled to the second input of the resonator drive circuitry;
    wherein the circuit determines a frequency for driving a resonator;

wherein the frequency tracker/controller further comprises back-emf estimation circuitry which estimates back-emf and generates an estimated back-emf signal based on a sensed resonator drive current and sensed resonator drive voltage generated from the first and second outputs of the sense circuitry respectively;

wherein the frequency tracker/controller further comprises a resonator resistance circuitry wherein the resonator resistance estimates resonator resistance based on the sensed resonator current signal that is sensed within a defined number of cycles of the estimated back-emf signal;

wherein the resonator resistance circuitry further comprises:
resistance estimation circuitry to estimate resonator resistance; and
resistance adjustment circuitry to adjust the estimated resonator resistance based on an estimated phase difference; and the back-emf estimation circuitry is configured to estimate back-emf at least in part based on the adjusted estimated resonator resistance; and wherein the amplitude control circuitry iteratively adjusts the amplitude of a resonator drive signal generated from the output of the amplitude control circuitry based on a difference between an estimated back-emf signal and a target back-emf signal derived from a rated back-emf and a resonant frequency FO.

2. The circuit of claim 1, wherein the frequency tracker/controller generates a frequency control signal for the first input of the resonator drive circuitry to iteratively adjust the frequency of the output of the resonator drive circuitry until the frequency of the output of the circuit is near a resonant frequency (FO).

3. The circuit of claim 1, wherein the sensed circuitry generates on the first output of the sensed circuitry a drive signal based on a sensed resonator current signal.

4. The circuit of claim 1 wherein the frequency tracker/controller further comprises a phase difference circuitry wherein the phase difference circuitry estimates phase difference by identifying back-emf zero crossing and/or back-emf peak crossing when sensed resonator drive current is above a defined current threshold.

5. The circuit of claim 1 wherein the resonator drive signal is one of a resonator drive current or a resonator drive voltage; and the sense circuitry is configured to sense a resonator current for a resonator drive voltage, or to sense a resonator voltage for a resonator drive current.

6. The circuit of claim 1 wherein the circuit drives a linear resonant actuator.

* * * * *